Jan. 7, 1936.　　　　O. HACKER　　　　2,027,302
RAIL WHEEL
Filed Sept. 14, 1932　　　3 Sheets-Sheet 1
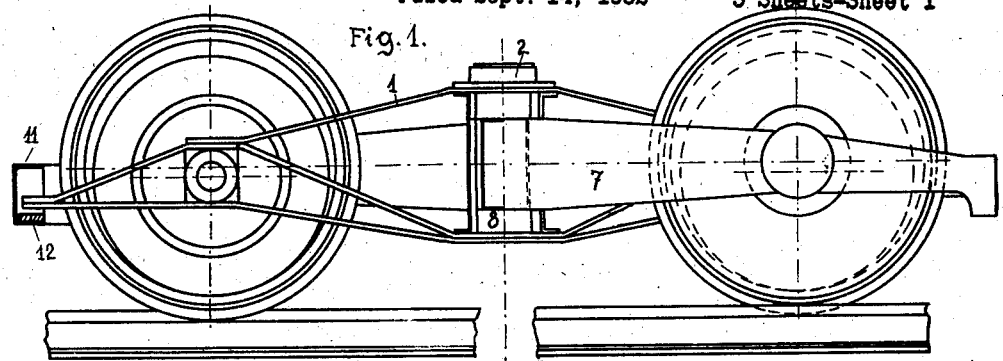
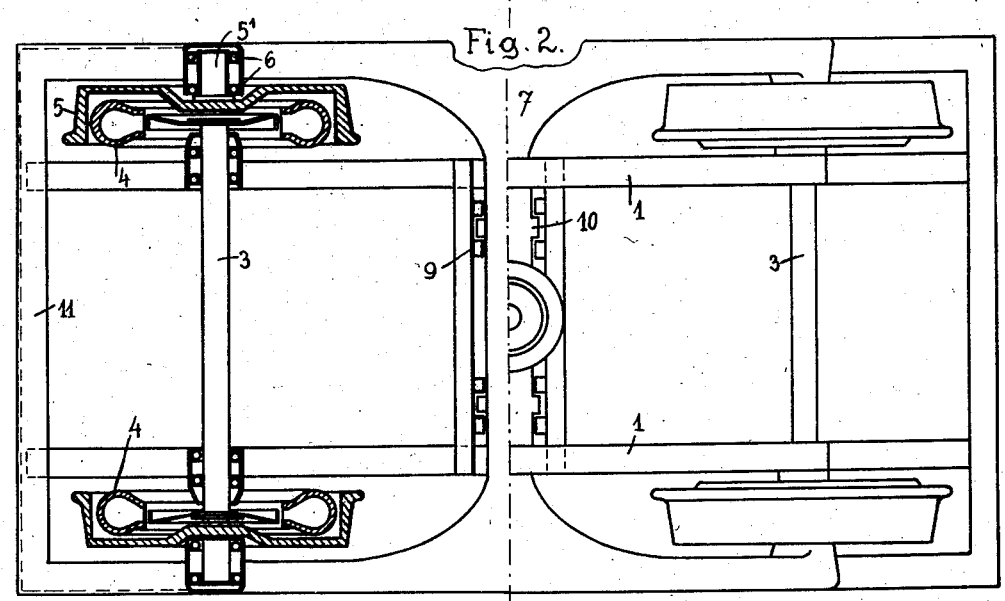
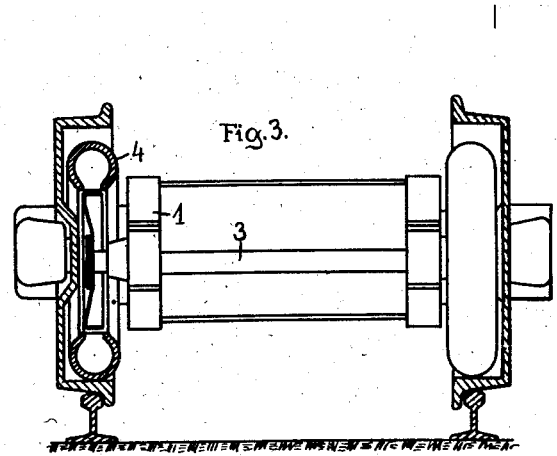
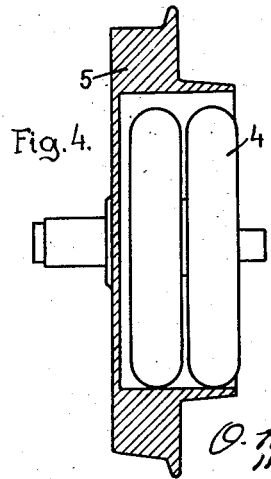
O. Hacker
INVENTOR Jan. 7, 1936. O. HACKER 2,027,302
RAIL WHEEL
Filed Sept. 14, 1932 3 Sheets-Sheet 2
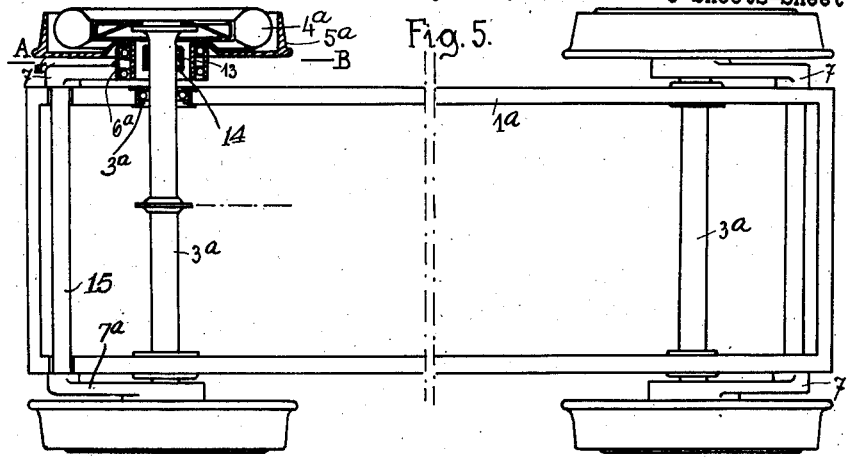
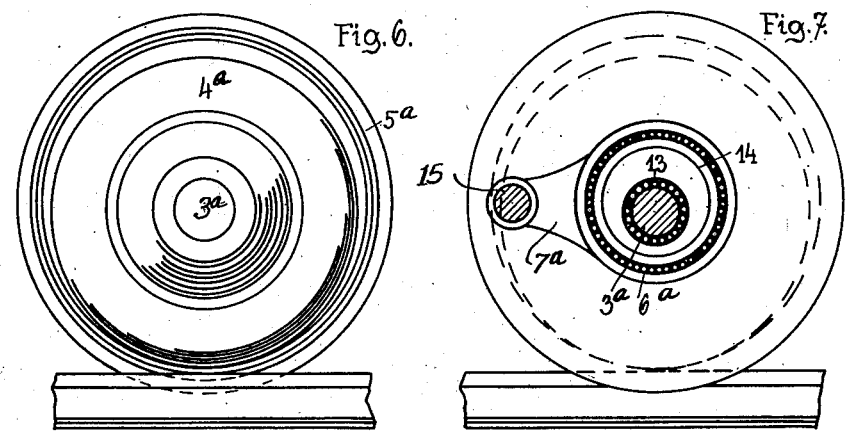
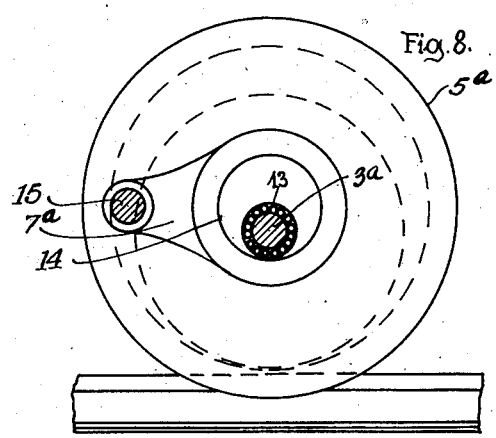
O. Hacker
INVENTOR
By Marks & Clerk
Attys.

Jan. 7, 1936.   Q. HACKER   2,027,302
RAIL WHEEL
Filed Sept. 14, 1932   3 Sheets-Sheet 3

O. Hacker
INVENTOR

By Marks & Clerk
Attys.

Patented Jan. 7, 1936

2,027,302

UNITED STATES PATENT OFFICE 2,027,302

RAIL WHEEL

Oskar Hacker, Wiener-Neustadt, Austria, assignor to the firm Austro-Daimler-Puchwerke A. G., Wiener-Neustadt, Austria Application September 14, 1932, Serial No. 633,188
In Austria February 13, 1932

22 Claims. (Cl. 105—215)

This invention relates to the running gear of rail vehicles, of the kind in which the tire is so arranged that with its outer periphery it can run on rails while its inner surface forms the running surface for the vehicle wheel and is of greater diameter than this wheel. From the known running gear of this kind that according to the invention differs substantially in this, that the system of the guiding wheels is journalled independently of the system of the vehicle wheels or supporting wheels. With such a running gear it becomes possible that the guiding wheels or the journalling of the guiding wheels will have neither driving nor supporting forces transmitted to it from the vehicle frame or from the system of the supporting wheels.

A preferred constructional form is one in which the guiding wheels are journalled independently of the vehicle wheels or supporting wheels on separate axles or separate stub axles.

The arrangement according to the invention is such that the guiding wheels are journalled on a guiding frame or frames which can perform a vertical motion with respect to the vehicle frame without the vehicle frame taking part in the said motion. Preferably the connection of the guiding frame with the vehicle frame is made such that the guiding frame can become displaced with respect to the vehicle frame in the longitudinal direction, preferably in opposition to a spring or the like, so that it will not transmit shocks acting oppositely to the direction of travel to the vehicle frame.

With a rail wheel of this kind, with which the supporting wheel is disposed within the drum forming the guiding wheel, so as to rotate therein, the guiding and the taking up of the load being thus effected separately by guiding wheels and supporting wheels respectively and the drum shell forming the tread or rolling surface for the supporting wheel, the supporting wheel runs like a normal supporting wheel with the sole difference that the lateral guiding action is left to a drum. Such a drum can be made of any width, even so wide that supporting wheels of any width, such for instance as double tires may be used, so that such a rail wheel can be constructed for supporting forces of any magnitude independently of the external profile of the drum.

In a preferred constructional form the arrangement of the axles for the supporting wheels and for the guiding wheels is such that the said axles have a certain amount of clearance with respect to one another in the vertical direction and in the lateral direction without any detrimental effect on the gauge. The two guiding wheels can therefore run with a constant gauge and form a rolling path for the rubber tired or pneumatic tired vehicle, in which case the arrangement may easily be made such that the pneumatic tires take up in the rolling paths of the guiding wheels not only the vertical load due to the weight of the vehicle body but may also serve the purpose, as in the case of a road vehicle travelling along curves, of taking up the lateral forces and thus without any variation in the gauge serve for supporting and guiding the vehicle.

Fig. 1 is a side view and partial section of parts of a vehicle showing two wheels and embodying one form of my invention.

Fig. 2 is a plan view and partial section showing four wheels and the correlated frames.

Fig. 3 is an end view and partial section of the same mechanism.

Fig. 4 is a sectional view of a modified form of wheel showing two of the inner resilient pneumatic tires.

Fig. 5 is a plan view and partial section showing another modification.

Fig. 6 is an outside elevation of one of the wheels of Fig. 5.

Fig. 7 is a sectional view on the plane of line A—B of Fig. 5 showing the inner side of the wheel opposite to that shown in Fig. 6.

Fig. 8 is a similar view but showing the position of the supporting wheel when its tire is deflated.

Figure 9:
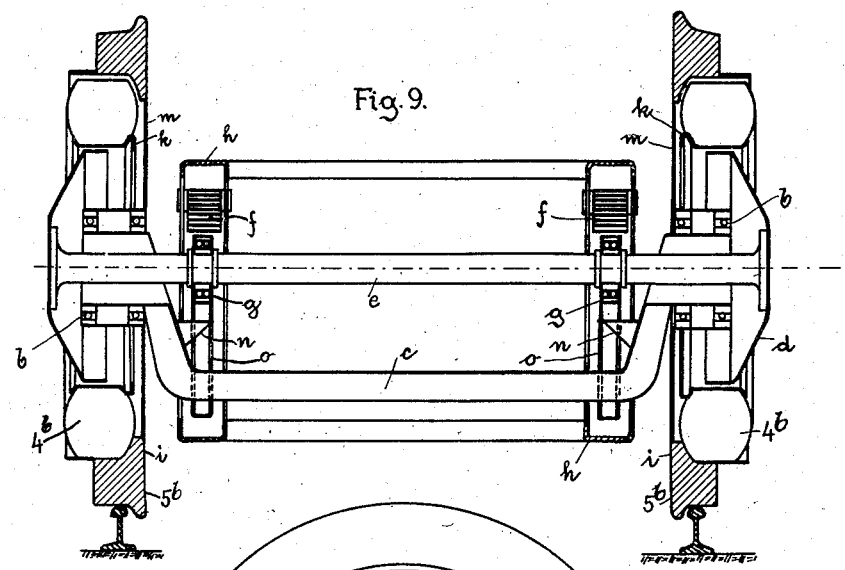
Fig. 9 is a vertical transverse sectional view showing another modification.

In the constructional example of a rail vehicle shown in Figs. 1–3, the vehicle consists of a bogie 1 which through the pivot pin 2 transmits the weight of the vehicle through the anti-friction bearings 3' to the supporting axles 3, on which the supporting wheels 4 are mounted, which are in the form of running wheels having pneumatic tires. The supporting wheels 4 run without any lateral guiding means in running drums 5 which are rotatably journalled with stub axles 5' in bearings 6 of a guide frame 7.

The guiding frame 7 is connected with the actual supporting frame (bogie 1) in such a manner that it is capable of performing upward and downward motions.

The guiding frame 7 can for instance be made movable by being mounted in an opening 8 of the supporting bogie 1 with plenty of clearance upwards and downwards. The lateral motions are limited by projections 9 or the like and counter projections 10, which thus also limit the lateral yield of the pneumatic tires.

Preferably the connection between the guiding frame 7 and the supporting frame 1 is made such that the guiding frame 7 can also perform a motion in the longitudinal direction of the vehicle, that is to say forwards and backwards.

The running drums 5 are made of such a width as to enable the employment of pneumatic tires having any desired supporting capacity, if necessary the employment of double tires (Fig. 4). At their outer periphery the running drums have the prescribed profile for rail vehicles.

As will be seen from the drawings, the diameter of the pneumatic tires 4 is at least under load smaller than the internal diameter of the guiding wheels 5. The result of this is that the pneumatic tire can roll freely. As the pneumatic tire is not wedged in, its capacity for deformation is also uninfluenced or in no way limited.

With such a supporting wheel which runs within a drum, that is to say, always on a smooth track, the wear of the tire is also reduced to a minimum.

On account of the resiliency of the pneumatic tire the load in actual practice is supported by a considerable part of the lower half of the tire so that the pressure per square inch is comparatively small.

In order to prevent the tire being destroyed if it should become deflated, arrangements are provided which act as a stop.

For this purpose the longitudinal girders of the supporting bogie 1 are extended to such an extent that they project into the transverse girders 11 of the guiding frame 7. A rubber buffer 12 or the like is there disposed in such a manner that on a tire becoming deflated the particular longitudinal girder of the supporting bogie frame 1 can rest on the rubber buffer.

The transmission of the driving forces is effected by way of the pneumatic tired supporting wheels through friction to the guiding wheels and from the latter to the rails.

It is possible to provide connections between the supporting wheels and the guiding wheels, which are yielding but are secured as regards rotation, such that in the case of deflation the transmission will remain unimpaired.

The braking forces may be transmitted either through the pneumatic tires to the guiding wheels or the guiding wheels may be provided with brake drums or brake shoes may coact directly with the peripheries of the drums forming the guiding wheels.

In the constructional example shown in Figs. 1 to 4, a bogie is employed, such as is for instance used in a four-axled vehicle.

The guiding wheels or guiding drums $5^a$ are, in the form shown in Figs. 5 to 8 journalled on guiding frames which lie between the wheels, such that the running wheels $5^a$ are accessible from the outside. The guiding frames are in this case formed by crank-like members $7^a$ which are on the ends of the shaft 15 which is transversely journalled in the actual supporting frame. These members $7^a$ form carriers for ball bearings $6^a$ for journalling the stub axles of the track wheels or guiding drums $5^a$.

On a tire becoming deflated the supporting shaft $3^a$ sinks to such an extent under the load of the vehicle that the ball bearing 13 of the vehicle axle comes in rolling contact with the hub or stub axle 14 of the guiding wheel $5^a$. By this means the weight of the vehicle is transmitted directly from the supporting axle to the guiding wheel (Fig. 8).

In the constructional example of Fig. 9 every metallic connection between the guiding wheels and their axle and the actual vehicle frame is avoided, which results not only in a complete damping of shocks, but also prevents the transmission of noises due to shock to the frame and body parts.

The guiding wheels $5^b$ are journalled with ball bearings $b$ on a rigid axle $c$. The guiding wheels form with their axle as it were a rolling path for the actual motor vehicle, which is supported by the pneumatic tires $4^b$ and the associated supporting wheels $d$ which are mounted on the supporting or driving axle $e$ and by springs $f$ and ball bearings $g$. For obtaining a low construction the vehicle frame $h$ is preferably in the form of a lattice girder, the top member of which extends above the springs $f$ and the bottom member below the axles.

The vehicle is driven through the supporting and driving axle $e$ in the usual manner by the friction between the pneumatic tires $4^b$ and the rolling paths of the guiding wheels $5^b$ and finally by the friction between the guiding wheels $5^b$ and the rails.

The vehicle is braked by brake blocks or brake bands which act directly on the guiding wheels or on brake drums connected with the latter. For the sake of clearance these brake drums are omitted from the drawings.

The running tracks of the guiding wheels $5^b$ are provided with internal rib-like ridges $i$ which with a suitable amount of clearance act as lateral guides for the pneumatic tires.

In order that, in the case of a tire becoming deflated or of particularly great stresses, the lateral movements of the vehicle with respect to the guiding frame shall not become too great, abutments are provided, for instance, such that the horn of the rim of the pneumatic tire is widened laterally so that the horn of the frame of the pneumatic wheel by being correspondingly widened at $k$ is brought nearer to the wheel body $m$ up to a certain amount. Should a tire become deflated, this widened lateral ring $k$ will, when the vehicle is driving round a curve, bear against the wheel body $m$ of the guiding wheel.

Furthermore in order that, on a tire becoming deflated, the supporting forces can be transmitted to the rails without endangering the tire, the axle $c$ is provided with a projection $n$, which forms an abutment for the casing of the bearing $g$, so that when the bearing $g$ and the projection bear against one another the axle $c$ also acts as a supporting member and makes it possible to continue travelling even with a deflated tire.

Figure 10:
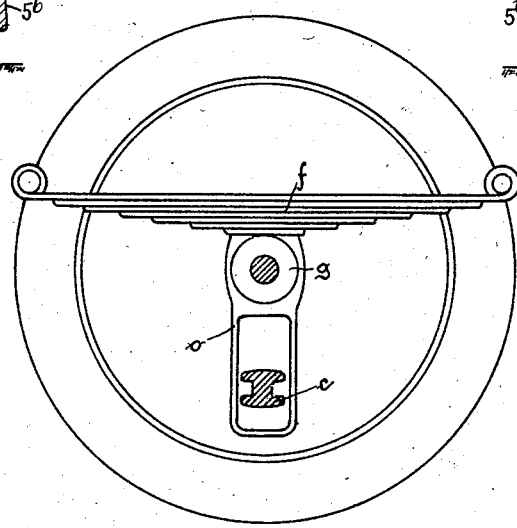
Fig. 10 is a sectional view showing one spring and the connecting yoke.

Preferably the guiding axle $c$ is loosely guided in slotted guides $o$ for the purpose of preventing the axle $c$ oscillating, for instance under the influence of the bearing friction in the bearing $b$ or under the influence of the retarding forces in the mass of the axle, when starting and when the brakes are being applied (Fig. 10).

The abutments may be made of noise-damping material such as rubber.

All the constructional forms have the advantage that a tire defect need not be immediately dealt with, but that it becomes possible to continue to travel with deflated tires to the next station without the tire being endangered. The form shown in Figs. 9 and 10 will be found claimed specifically and with improvements in my application Serial No. 689,193 filed September 13, 1933.

From the drawings it will be apparent that irrespective of what well known type of tire securing means is used to hold the tire on the inner wheel, that the supporting means described for transmitting the load when the tire is deflated, permits the tire or wheel to be changed while the load is held by this supporting means.

What I claim is:

1. Running gear for rail vehicles, comprising in combination drum-shaped guiding wheels having a profile like that of a rail wheel, supporting wheels with resilient tires within the said guiding wheels and capable of running therein, and stub axles for the guiding wheels, which are independent of the axles of the supporting wheels.

2. Running gear for rail vehicles, comprising in combination drum-shaped guiding wheels having a profile like that of a rail wheel, supporting wheels with resilient tires within the said guiding wheels and capable of running therein, a vehicle frame, and a guiding frame constituted by cranks on which the guiding wheels are journalled and which is adapted to move vertically with respect to the vehicle frame without the latter taking part in this motion.

3. Running gear for rail vehicles, comprising in combination drum-shaped guiding wheels having a profile like that of a rail wheel, supporting wheels with resilient tires within the said guiding wheels and capable of running therein, a vehicle frame, a guiding frame on which the guiding wheels are journalled and which is adapted to move vertically and longitudinally with respect to the vehicle frame without the latter taking part in this motion, and abutments for limiting the vertical motion of the guiding frame.

4. Running gear for rail vehicles, comprising in combination drum-shaped guiding wheels having a profile like that of a rail wheel, supporting wheels with resilient tires within the said guiding wheels and capable of running therein, bearings for the guiding-wheels and bearings for the supporting wheels disposed one within the other in such a manner that they are independent of one another as regards vertical motion and motions in the direction of travel.

5. Running gear for rail vehicles, comprising in combination drum-shaped guiding wheels having a profile like that of a rail wheel and supporting wheels with resilient tires within the said guiding wheels and capable of running therein, a vehicle frame and a rigid axle for the guiding wheels, which axle has no metallic connection with the vehicle frame.

6. Running gear for rail vehicles, comprising in combination drum-shaped guiding wheels having a profile like that of a rail wheel, supporting wheels with resilient tires within the said guiding wheels and capable of running therein and of lateral motion independently of the guiding wheels and means for limiting the said lateral motion, the resilient tires being capable of sustaining not only the vertical load, but also the lateral forces during their guiding action and the system of guiding wheels being journalled independently of the system of supporting wheels.

7. Running gear for rail vehicles, comprising in combination drum-shaped guiding wheels having flanges for engaging a rail, supporting wheels with pneumatic tires within the said guiding wheels and capable of running therein, axles for the guiding wheels which are independent of the axles of the supporting wheels and having clearance in a lateral direction between the axles of the supporting wheels and the guiding wheels, said tires also acting as elastic means for limiting the lateral motion within the said clearance, and abutments as a safety means against a failure of the elastic motion limiting means.

8. In combination, a vehicle including a frame, front and rear axles, wheels on said axles, a resilient tire on each of said wheels, other wheels associated each with one of said first mentioned wheels and each having a rail engaging tread and an internal annular track upon which the tire of the associated first mentioned wheel has a rolling engagement, and means between said other wheels and frame for operatively connecting them together, so that said other wheels are maintained to gauge and move with the vehicle, said means having a pivotal connection with the frame in a direction transversely thereof.

9. In combination, a vehicle including a frame, front and rear axles, wheels on said axles, a resilient tire on each of said wheels, other wheels associated each with one of said first mentioned wheels and each having a rail engaging tread and an internal annular track upon which the tire of the associated first mentioned wheel has a rolling engagement, a member spaced laterally from each side of the frame and connected thereto for a pivotal movement about an axis transversely of said frame, and means providing a rotative bearing for each of said other wheels with respect to its associated member.

10. In combination, a vehicle having a frame, a rubber tired wheel operatively connected thereto, a second wheel having a rail engaging tread and formed to provide an internal annular track, upon which the said rubber tired wheel has rolling engagement, a member operatively connected to said frame and arranged outside of said other wheel, and means for rotatively mounting said other wheel with respect to said member.

11. In combination, a vehicle having a frame, a rubber tired wheel operatively connected thereto, a second wheel having a rail engaging tread and formed to provide an internal annular track, upon which said rubber tired wheel has rolling engagement, a member operatively connected to said frame and arranged outside of said other wheel, an axle stud carried by said other wheel, and a bearing box carried by said member and in which said stud is journalled.

12. Running gear comprising a pair of pneumatically tired wheels, a load axle for said wheels, anti-friction bearings through which the load is normally transmitted to said wheels, flanged track wheels having inner drum-like surfaces in which the pneumatically tired wheels travel, bearings for the track wheels, means for keeping the track wheels at the proper track gage, means for transferring the load from the load axle to the track wheels in case of deflation of a tire and means for taking up lateral displacement of one pair of wheels with respect to the other pair.

13. Running gear for a vehicle comprising two oppositely disposed track wheels rotatable independently of each other, means connecting said wheels transversely of the vehicle, an anti-friction bearing for each wheel supported by said connecting means, a resiliently tired wheel supported to run inside of each track wheel, an axle connecting said resiliently tired wheels, a main load frame, antifriction bearings carried by said frame for the respective resiliently tired wheels, said frame and said axle being movable vertically with respect to said track wheels, means discrete from the tires for limiting the forward and back movement of the axle with respect to the track wheels and means discrete from the tires for limiting the downward movement of the axle with respect to the track wheels.

14. The combination with a supporting axle, of a resiliently tired wheel mounted on said axle, means non-rotatably mounted on said axle, a hub support surrounding said axle and having an inner diameter larger than the outer diameter of said axle to allow relative movement, a guide wheel having a hub rotatably carried by said hub support and receiving said supporting wheel which is adapted to run therein, and connecting means between said non-rotatable means and said hub support permitting said non-rotatable means and said axle to move upwardly and downwardly with respect to said hub support and said guide wheel.

15. The combination with a supporting axle, of a resiliently tired wheel mounted on said axle, means non-rotatably mounted on said axle, a guide wheel receiving said supporting wheel adapted to run therein and having a hub around said axle mounted for relative radial movement therewith, and at least one securing member pivotally connected between said means and said guide wheel hub to allow relative vertical movement between said wheels.

16. The combination with an axle, of a pair of resiliently tired supporting wheels mounted on opposite ends of said axle, a pair of spaced non-rotatable means mounted on said axle, a pair of hub supports surrounding said axle, each having an inner diameter larger than the outer diameter of said axle to allow relative movement and adapted to cooperate with one of said non-rotatable means, a pair of guide wheels each having a hub rotatably carried by one of said hub supports and receiving one of said supporting wheels adapted to run therein, and connecting means between each of said spaced non-rotatable means and the hub support cooperating therewith for permitting said non-rotatable means and said axle to move upwardly and downwardly with respect to said hub support and said guide wheel, and at least one tie means connected between said spaced non-rotatable means.

17. The combination with a guide wheel, a resilient tired wheel adapted to run within the guide wheel, a load supporting axle on which the tired wheel is mounted, said axle passing through but radially spaced from said guide wheel to allow relative vertical movement therebetween, a fitting mounted on said axle and means connecting said fitting and guide wheel and capable of moving with the relative movement between said guide wheel and tired wheel.

18. The combination with a load supporting axle, of a wheel mounted on said axle, a resilient and inflated tire on said wheel, a guide wheel surrounding and supporting said tired wheel and having its central portion radially spaced from said axle to allow relative movement therebetween due to vibrations, a normally inactive auxiliary support within the guide wheel for supporting the load carried by the axle and effective only when the tire is deflated, said guide wheel being radially outside the tire and wheel on said axle and being axially inside of the tire on the first mentioned wheel to provide accessibility for said wheel and its tire.

19. The combination with a load supporting axle, of a wheel mounted on said axle, a resilient and inflated tire on said wheel, a guide wheel surrounding and supporting said tired wheel and having its central portion radially spaced from said axle to allow relative movement therebetween due to vibrations, a normally inactive auxiliary support within the guide wheel for supporting the load carried by the axle and effective only when the tire is deflated, said guide wheel being radially outside the tire and wheel on said axle and being axially inside of the tire on the first mentioned wheel to provide accessibility for said wheel and its tire, said guide wheel being out of contact with the tire on at least one side to permit lateral expansion of said tire under impact and also when said tire is deflated.

20. The combination with a load supporting axle, of a wheel mounted on said axle, a resilient and inflated tire on said wheel, a guide wheel surrounding and supporting said tired wheel and having its central portion radially spaced from said axle to allow relative movement therebetween due to vibrations, a normally inactive auxiliary support for the load carried by the axle and effective only when the tire is deflated, and abutments radially spaced from said axle and independent of the tire for taking up lateral thrusts between the guide wheel and the tired wheel.

21. The combination with a load supporting axle, of a wheel mounted on said axle, a resilient and inflated tire on said wheel, a guide wheel surrounding and supporting said tired wheel and having its central portion radially spaced from said axle to allow relative movement therebetween due to vibrations, a normally inactive auxiliary support for the load carried by the axle and effective only when the tire is deflated, and abutments radially spaced from said axle and independent of the tire for taking up lateral thrusts between the guide wheel and the tired wheel, said abutments being closely spaced and having therebetween a rib carried from said guide wheel and capable of movement up and down between said abutments.

22. The combination with a load supporting axle, of a wheel mounted on said axle, a resilient and inflated tire on said wheel, a guide wheel surrounding and supporting said tired wheel and having its central portion radially spaced from said axle to allow relative movement therebetween due to vibrations, a normally inactive auxiliary support within the guide wheel for supporting the load carried by the axle and effective only when the tire is deflated, said guide wheel being radially outside the tire and wheel on said axle and being axially inside of the tire of the first mentioned wheel to provide accessibility for said wheel and its tire, said auxiliary support being around said axle and within a hub-like portion of the guide wheel.

OSKAR HACKER.